(12) United States Patent
Corman et al.

(10) Patent No.: US 7,165,023 B2
(45) Date of Patent: Jan. 16, 2007

(54) METHOD FOR MINING, MAPPING AND MANAGING ORGANIZATIONAL KNOWLEDGE FROM TEXT AND CONVERSATION

(75) Inventors: Steven R. Corman, Chandler, AZ (US); Kevin J. Dooley, Chandler, AZ (US)

(73) Assignee: Arizona Board of Regents, Tempe, AZ (US)

( * ) Notice: Subject to any disclaimer, the term of this patent is extended or adjusted under 35 U.S.C. 154(b) by 830 days.

(21) Appl. No.: 10/023,556

(22) Filed: Dec. 17, 2001

(65) Prior Publication Data

US 2002/0116170 A1   Aug. 22, 2002

Related U.S. Application Data

(60) Provisional application No. 60/255,834, filed on Dec. 15, 2000.

(51) Int. Cl.
*G06F 17/20* (2006.01)
*G06F 17/27* (2006.01)

(52) U.S. Cl. ............................................. 704/9; 704/1

(58) Field of Classification Search ................ 704/1, 704/9, 10; 707/102
See application file for complete search history.

(56) References Cited

U.S. PATENT DOCUMENTS 5,404,506 A * 4/1995 Fujisawa et al. ............... 707/4
5,715,468 A * 2/1998 Budzinski ....................... 704/9
6,212,494 B1 * 4/2001 Boguraev ....................... 704/9
6,473,730 B1 * 10/2002 McKeown et al. ............. 704/9
6,901,399 B1 * 5/2005 Corston et al. ................. 704/9

OTHER PUBLICATIONS

Hearst, M. (1998), "Automated Discovery of WordNet Relations," in WordNet: An Electronic Lexical Database, Christiane Fellbaum (ed.), MIT Press.*
Sanderson, M. and B. Croft (1999). "Deriving Concept Hierarchies from Text." In Proceedings of the22nd annual international ACM SIGIR conference on Research and Development in Information Retrieval, pp. 206-213.*
Chang et al; "A Hybrid Approach to Object Library Classification and Retrieval," Computer Software and Applications Conference, 1995. COMPSAC 95. Proceedings., Aug. 9-11, 1995 pp. 278-283.*

* cited by examiner

*Primary Examiner*—David Hudspeth
*Assistant Examiner*—James S. Wozniak
(74) *Attorney, Agent, or Firm*—Robert D. Atkins; Quarles & Brady Stretch Lang LLP (57) ABSTRACT

A network text analysis called center resonance analysis (CRA) is presented which represents texts (or transcribed conversations) as networks of centering words. The networks of centering words are components of utterances or (specifically noun phrases) that authors and/or speakers deploy in a manner that makes their utterances coherent. A CRA network can be derived for any text, and abstractly represents its main concepts, their influence, and their interrelationships.

31 Claims, 5 Drawing Sheets

ARGUMENTS BY ADVOCATES AND OPPONENTS OF CHANGE

| ARGUMENTS BY ADVOCATES* | ARGUMENTS BY OPPONENTS** |
|---|---|
| (JAMES, 82) IN ALL OUR PREVIOUS DISCUSSIONS, AND TOPTEAM HAD BEFORE WE CAME UP HERE TO PALOMINO, WE THOUGHT, AND MANY INDIVIDUALS RAISED THE POINT, THAT WE SHOULD BE TRYING, DIFFICULT AS IT IS FOR ALL OF US, TO BE OBJECTIVE ABOUT WHAT WE SAY IN THESE REPORTS. WE SHOULD THINK OF THE ORGANIZATION NOT IN TERMS OF THE INCUMBENCY OF ANY ONE POSITION, BUT AS TO HOW THE ORGANIZATION ITSELF SHOULD BE BEST STRUCTURED FROM THE POINT OF VIEW. AND WE ARE DODGING THE ISSUE BECAUSE WE ARE SAYING THIS. IT MAY POSSIBLY POINT THE FINGER TO ANY ONE OF US, AND THAT IS TOO DELICATE AN AREA FOR US TO DISCUSS.<br><br>(JACK, 85) TOPTEAM OUGHT TO HAVE ENOUGH NERVE, OR GUMPTION, TO LOOK AT THE COMPANY AND SAY TO OUR PRESENT PRESIDENT IN WRITING, THIS. LOOK, MR. PRESIDENT, YOU HAVE TO BE ORGANIZED BECAUSE WE HAVE CERTAIN WEAKNESSES, AND IF WE DO NOT DO THIS, THE COMPANY IS NOT GOING TO MOVE. TOPTEAM WAS WILLING TO DO IT, BUT WHEN IT COMES TO INDIVIDUALS, YOU WANT TO CHECK IT OUT, BECAUSE YOU MAY HAVE TO GIVE AND YOU MAY HAVE TO TAKE LOSSES.<br><br>(JACK, 92) BUT TOPTEAM HAS A RESPONSIBILITY AS A GROUP TO PUT THIS KIND OF RECOMMENDATION ON THE BOARD THE SAME WAY AS TOPTEAM DID OTHER RECOMMENDATIONS, RATHER THAN LEAVE IT AGAIN FOR A HAPHAZARD PUTTING TOGETHER WITHOUT THE RESOURCES TO PUT TOGETHER OR CALL ANOTHER MEETING FOR THAT PURPOSE. | (ARNOLD, 88) IT SEEMS TO ME THAT WHILE THERE MAY BE SOME BENEFIT FROM THE EXERCISE I REALLY SEE THAT WE WILL GO THROUGH THE EXERCISE FOR SEVERAL HOURS, MAYBE SEVERAL DAYS, AND TOPTEAM WILL HAVE A VERY HEATED DISCUSSION. IT IS INCONCEIVABLE TO ME THAT IT COULD BE RESOLVED WITHOUT A HEATED DISCUSSION. THEN THE WHOLE THING CAN BE A COMPLETE WASTE OF TIME BECAUSE OF THE RELATIONSHIPS BETWEEN THE CHAIRMAN AND THE PRESIDENT AND HOW THEY SEE THE JOB.<br><br>(SAM, 89) WHEN A MAN IS MADE THE CHIEF EXECUTIVE OFFICER, AND I AM JUST USING THE PRESIDENT BY WAY OF EXAMPLE, THEN HE IS GOING TO DETERMINE THE KIND OF A STRUCTURE HE IS GOING TO OPERATE IN EFFECTIVELY IN ORDER TO ACHIEVE THE DESIRED GOALS. YOU'RE SAYING TO HIM, TOPTEAM WILL MAKE YOU THE PRESIDENT BUT THIS IS THE WAY YOU'RE GOING TO HAVE TO OPERATE.<br><br>(ARNOLD, 94) TRADITIONALLY THE PRESIDENT OF THE UNITED STATES OR THE PRIME MINISTER UNDER THE PARLIAMENTARY SYSTEM ALONE CHOOSES HIS OWN CABINET AND FOR THE MOST PART THE CHOICE OF CABINET DEPENDS ON THE SKILLS OF THAT PARTICULAR INDIVIDUAL. I THINK IT WAS OBVIOUS THAT KENNEDY CHOSE A VERY WEAK SECRETARY OF STATE BECAUSE HE HIMSELF WANTED TO DO THE SECRETARY OF STATE'S JOB. I THINK THAT FOR A PRESIDENT TO COME UNTO THE JOB WITHOUT THIS CHOICE BEING MADE BY HIM PUTS HIM AT A VERY SERIOUS DISADVANTAGE.<br><br>(IRVING, 110) I THINK THAT THE GROUPINGS THAT ARE MADE ARE REALLY THE PREROGATIVE OF THE CHAIRMAN AND WHOEVER HE NOMINATES TO BE THE PRESIDENT. AND THOSE GROUPINGS MUST BE MADE ON TWO BASES, AND I DO NOT KNOW IF WE CAN GO MUCH DEEPER WITH IT OVER HERE. NUMBER ONE IS WHAT IS A NATURAL GROUPING BUSINESS WISE, AND NUMBER TWO IS THE COMPETENCE OF THE PEOPLE AVAILABLE, IN THE JUDGMENT OF THE CHAIRMAN AND HIS PRESIDENT. THAT WILL OBVIOUSLY HAVE TO DETERMINE TO SOME DEGREE THE GROUPINGS FUNDAMENTALLY BASED UPON THE NATURAL GROUPINGS THAT ARE AVAILABLE TO US. BUT I THINK THAT BEYOND THAT, YOU HAVE TO TAKE PEOPLE INTO ACCOUNT AND INTO CONSIDERATION AND TOPTEAM SHOULD LEAVE HERE READY TO SAY THAT WHATEVER THESE PEOPLE DEEM TO BE IN THE BEST INTEREST OF THE CORPORATION, THIS IS WHAT TOPTEAM WILL HAVE TO GO ALONG WITH. I DO NOT THINK WE CAN GO BEYOND THAT POINT. |

* THESE STATEMENTS ARE EDITED SLIGHTLY FROM THE TRANSCRIPT. THEY INCLUDE ONLY THE STATEMENTS MADE AFTER THE SUGGESTION TO LET THE NEXT PRESIDENT DECIDE ON HIS/HER OWN STRUCTURE WAS MADE.

** THESE STATEMENTS ARE EDITED SLIGHTLY FROM THE TRANSCRIPT.

METHOD FOR MINING, MAPPING AND MANAGING ORGANIZATIONAL KNOWLEDGE FROM TEXT AND CONVERSATION

CROSS-REFERENCE TO RELATED APPLICATIONS

This application claims priority to U.S. Provisional Application No. 60/255,834 filed Dec. 15, 2000 which is hereby incorporated by reference.

FIELD OF INVENTION

The present invention relates generally to a method for analyzing text using a network. More particularly, the present invention relates to a method for mining, mapping, and managing organizational knowledge from written text and conversation which identifies discursively important words and represents them collectively as a network. Structural properties of the network are then used to index word importance.

BACKGROUND OF THE INVENTION

Organizational knowledge includes symbols, routines, and resources that are used by an organization's members to coordinate action and interaction. The management of an organization's knowledge is of great strategic importance to that organization.

In order to study organizational knowledge, data must be obtained from organizational discourse, namely written texts and conversation. However, once organizational discourse is obtained, the massive amount of data resulting from such discourse must be analyzed.

Informational technology plays a key role in facilitating organizational knowledge and learning via a process of knowledge mapping, mining, and management. Knowledge mining involves the capture of organizational knowledge embedded in text and conversation; knowledge mapping involves representing such knowledge artifacts and their source and content in useful ways; and knowledge management involves the application of such analyses for organizational benefit. Text analysis comprises this process of mapping, mining, and managing.

There are many different approaches to text analysis. Three main approaches of text analysis are based on inference, positioning, and representation. Approaches based on inference draw conclusion about what is not given in the text. Inference approaches apply rules or learned patterns to content that is directly given in the text or, alternatively, distinguish important material from unimportant material using similar sets of rules. In positioning approaches, abstract profiles of texts are generated and then positioned using spatial modeling techniques that are relative to other texts in a set or corpus. Representational approaches produce representations of texts by extracting or distilling its given content without reference to a training set, corpus, semantic rule set, or field of other documents. The representations are instrinsically meaningful and do not depend on outside contexts or sources of information. Representational approaches include keyword indexes and network text analysis.

Those approaches based on a concept network are best suited for capturing discourse by computer. The common theme in network text analysis is that text can be represented as a network of co-occurrences of words. The variations are in the details of how the links are formed. In most existing approaches, words are counted as being linked if they co-occur within some arbitrarily sized "window" of words as it is slid along the text. Once the text is represented in the form of a network of concepts, it is susceptible to a range of powerful analysis techniques that can describe the structural properties of particular words and/or the overall network.

However, in network text analysis, there is not much consistency in the ways that researchers represent text as a network. Problems include 1) that the criteria for unitizing the text are seldom well established, and 2) that the networks themselves are not very thoroughly conceptualized (i.e. researchers do not always address what a link means in theoretical terms or state exactly what it is that flows through a network of words).

Accordingly, there is a need for a representational network text analysis approach which 1) is based on a network representation of associated words that takes advantage of the complex data structure offered by that network, 2) represents intentional, discursive acts of competent authors and speakers, and 3) is versatile and transportable across contexts.

SUMMARY OF THE INVENTION

The present invention is directed to a method for network text analysis entitled Central Resonance Analysis (CRA). CRA can be applied to large quantities of written text, as well as transcribed conversation, and has broad applications. CRA identifies discursively important words and represents them as a network. Structural properties of the network are then used to index word importance. Therefore, the structuring of word importance is performed without reference to other texts, corpora, rule sets, training data, etc.

CRA is a representational method that assumes that competent authors and/or speakers generate utterances that are locally coherent by focusing their statements on conversational centers. These centers are noun phrases that constitute the subjects and objects of utterances. For example, each sentence in a written text (except the first sentence) has a backward looking center that refers to a preferred forward-looking center which is expressed in the previous utterance. CRA codes the ways that authors deploy centers in order to create a structure of conceptual relationships in the authors' text.

CRA employs four steps to generate a representation of a text. First, a selection step is performed to unitize the centers by grammatically parsing the utterances. More specifically, noun phrases in the utterances are identified and extracted from the text for further analysis. One or more nouns and zero or more adjectives make up the noun phrases. In one aspect of the invention, disambiguated nouns may be substituted for pronouns that represent them when the pronouns are relevant to the analysis. In another aspect of the invention, minimal affix stemming is performed to change plural words to their singular forms by removing "s" or "es" suffixes.

Second, a linking step is performed where the component words (nouns and adjectives) of each noun phrase are sequentially linked within sentences, and all possible co-occurrences of words within larger noun phrases are linked thereby converting word sequences into networks of relationships between words.

Third, an indexing step is performed in which the network of word associations is analyzed to determine the relative structural influence of each word. Betweenness centrality is used to measure the stuctural influence of the words and best represents the extent to which a particular centering word mediates chains of association in the CRA network.

Fourth, a mapping step or application is performed where the indexed CRA network, or a set of indexed networks, is used for some type of analysis task. For example, one such task could be the visualization of the CRA network in order to understand the content of the text. Other applications include, but are not limited to, spatial modeling of resonance scores, information retrieval, and thematic analysis of collections.

The mutual relevance of one or more texts can be measured by using resonance. Resonance can be measured based on the common words in one or more documents (word resonance) or it can be based on words pairs that are common in one or more documents (pair resonance). The more word resonance two texts have, the more the communicators of the texts used the same words, and the more those words were prominent in structuring the coherence of the text. The more pair resonance two texts have, the more the authors of the texts assembled words in the same ways in order to make their communication coherent. Resonance scores can be used to search or model one or more texts

BRIEF DESCRIPTION OF THE DRAWINGS

The present invention is illustrated by way of example and not limitation in the accompanying figures, in which FIGS. 1–4 depict one application of the network text analysis method of the present invention, namely CRA network visualization using a transcribed videotape of organizational decision making, and FIGS. 5–6 depict another application of the network text analysis method of the present invention, namely spatial modeling used to cluster university faculty in an interdisciplinary research area, and in which:

FIG. 1 is a table of important statements both supporting and opposing a need for structural change within an organization;

DETAILED DESCRIPTION

The present invention is directed to a network analysis method for mining, mapping, and managing organizational knowledge from text and conversation. The network analysis method is entitled Center Resonance Analysis (CRA). CRA codes the co-occurrence of words used by authors and/or speakers to center their utterances, thereby transforming text and transcribed conversation into abstract network representations. CRA describes these networks via quantitative metrics and visual maps, and matches documents and text through an analysis of their resonance.

In CRA, communication is unitized in terms of words contained in the noun phrases that make up utterances. Utterances are sentences, or the conversational equivalent of sentences, which represent finite groups of centers constructed by communicators to fit into a coherent stream of other utterances or sentences. Noun phrases identify the centers and the words making up the noun phrases function as linkable units.

CRA is concerned with the deployment of a stream of centers within utterances. CRA assumes coherent communication by competent writers and speakers and extracts some of its associated structure. Four steps are involved in generating a CRA representation of a text. These steps include a selection step which parses utterances into their component noun phrases, a linking step which converts the sequences of words contained in noun phrases into networks of relationships between words, an indexing step where the network of word associations is analyzed to determine the relative influence of each word, and a mapping or application step where the indexed CRA network, or a set of indexed CRA networks, is used for a type of analysis task such as visualization of the CRA network to understand text, for example. The four steps are described below in more detail.

Selection

CRA categorizes texts in terms of a pattern of connections between words that are crucial to the centering process. Compiling the words and their connections across all utterances in a text yields a CRA network representing the text. The procedure is in the spirit of earlier network text analysis methods, but represents a more restricted form of linking that takes account of the discursive structure of the utterance. It begins with selection. Rather than linking all words that fall within an arbitrarily-sized window of text, CRA parses an utterance into its component noun phrases. A noun phrase is a noun plus zero or more additional nouns and/or adjectives, which serves as the subject or object of a sentence. Determiners (the, an, a, etc.), which can also be parts of noun phrases, are dropped in CRA analyses. Thus, a noun phrase is represented by one or more words, and a sentence can consist of one or more noun phrases. Since the centering process operates largely through noun phrases, this step acts as a filter that turns sentences into sequenced sets of words contained in noun phrases.

Before moving to the next step of the CRA method, there are a few important issues to note. First, CRA intentionally excludes the other main component of utterances, namely verb phrases. In the linguistic model underlying CRA, verb phrases would be the "action" components linking different noun phrases in an utterance. As such, they are really a different kind of information, about the contexts of action that link the centers. Given the concern to represent the manifest content of texts, rather than provide inferences about the significance of particular utterances in ongoing interaction, the exclusion of verb phrases is logical. Noun phrases, according to linguistic semanticists, are the only elements that can be unambiguously classified as entities in discourse. Nouns denote conceptual categories that provide more salient discourse information than verbs and generally control the use and expression of verb phrases. Moreover, nouns are less likely than verbs to be temporally situated, and are thus more likely to be portrayed as entities (i.e., concepts) in discourse. In short, the parsing of texts into networks of noun phrases, and the concomitant exclusion of verbs, aligns both a guiding model of discourse coherence and a representation for the manifest content of texts.

The inclusion or exclusion of pronouns in CRA is contingent on the purpose of the investigation and the quantity of texts involved. In most spoken and written texts, proper nouns or referents are introduced before pronouns and topic shifts are introduced by specific nouns, meaning that little textual information is lost by dropping pronouns (as backward-looking centers) that appear later. Therefore, CRA can safely forego disambiguation of pronouns, dropping them from the analysis. In other cases, the identification of actors pronominalized (by words such as she, he, it, I, we or they) may be relevant to the analysis. In those cases, disambiguated nouns may be substituted for the pronouns that represent them.

Stemming is used to convert words to more basic root forms before analyzing them. However, stemming can obscure important shades of meaning. For example, the statements "the negotiators connected on the issues" and "there was a disconnect between the negotiators on the issues" would stem to the same set of objects, despite quite opposite meanings. Accordingly, CRA adopts only minimal affix stemming, going from plural to singular forms by removing "s" or "es" suffixes.

Linking

The second step, linking, converts the word sequences into networks of relationships between words. The author or speaker of a text being analyzed with CRA intentionally groups the words into noun phrases and strings these phrases together (using verbs, pronouns, determiners, etc.) to form an utterance. CRA linking rules embody those choices. All words comprising the centers in the utterance are linked sequentially. In the majority of cases, where noun phrases contain one or two words, the sequential connections capture all the linkage intended by the author; there no higher-order connections are possible without crossing the boundaries of the noun phrases. However, there are cases where three or more words are contained in a single noun phrase. Here just the sequential links do not exhaust the connectedness possible in the set created by the author. Therefore, all possible pairs of words are linked within the noun phrases. For example the phrase "complex discursive system" would generate the links: complex-discursive, discursive-system, and complex-system.

Accumulating links over a set of utterances comprising a text (or a paper, a collection of papers, a transcribed speaking turn or set of turns, and so on) yields a symmetric, valued, undirected network whose nodes represent the center-related words. In a CRA network the link values represent the number of times the words were linked in the text according to the rules above. This network, when indexed as described in the next step, becomes a fundamental representation of the text and forms the basis for all applications of CRA.

Indexing

The third step in CRA is indexing. Here the network of word associations is analyzed to determine the relative influence of each word (or node). This is a key step in differentiating the words. Network metaphors are always based on some abstract notion of flow, and in the case of CRA networks there is a flow of meaning. To the extent that a CRA network is structured, some words are more influential than others in channeling flows of meaning. In other words, some words are literally more meaning-full than other words in the network. Therefore, identifying the structural influence of the words allows one to measure this property. The idea of influence is operationalized as the centrality of a given word in the CRA network. Although a variety of measures could be used, centering theory points most clearly toward betweenness centrality. The concept of betweenness centrality has been described as the "rush" in a graph where the "rush" in an element is the total flow through the element, resulting from a flow between each pair of vertices. Betweenness centrality can be contrasted with other classic measures of centrality. Consider a minimal network of four peripheral nodes that are all connected to a single node in the middle (but not to each other). There are at least three senses in which the node in the middle is central. It is connected to a lot of nodes, relative to the others, which is the notion of degree centrality. It is also very directly connected to all of the other nodes, whereas the peripheral nodes are at least two steps away from each other. This reflects the notion of closeness centrality, usually measured as the average number of steps required to reach other nodes in the network from a focal node. The middle node is also central in the sense that any kind of resources flowing in the network (meaning, in the case of CRA networks) must flow through it. This is the idea of "rush" or betweenness centrality described above. Each of these measures can be computed for the network as a whole, as well as for the individual words (or nodes).

Of the various kinds of centrality, betweenness centrality is the most appropriate for estimating the influence of words in CRA. Degree centrality, the most often applied measure in earlier network text analysis efforts, takes only the local connections of each word (or node) into account. Closeness centrality is better in that it considers the entire network structure. However, it cannot be computed for disconnected graphs, which in CRA are not only possible but likely for low-coherence texts. More important, closeness undervalues the influence of words (or nodes) lying on paths connecting disparate parts of the network because words (or nodes) in the center of large, densely connected clusters will have higher closeness, on the average. From the standpoint of maintaining coherence in a structure of words, this "tying-together" function is crucial. Betweenness centrality therefore best represents the extent to which a particular centering word (represented by a network node) mediates chains of association in the CRA network. It tells us how a given node channels the "rush" of meaning through a network of centering words. The influence I of a word i in text T is operationalized as:

$$I_i^T = \frac{\sum_{j<k} g_{jk}(i)/g_{jk}}{[(N-1)(N-2)/2]}$$

where $g_{jk}$ is the number of shortest paths connecting the $j^{th}$ and $k^{th}$ words, $g_{jk}(i)$ is the number of those paths containing word i, and N is the number of words in the network.

Resonance is a latent property of the structure of a CRA network. While resonance is a property of a single network, it is only realized in the presence of an external signal (i.e., another network), just as a physical material only resonates when brought into contact with an external vibrating wave. To the extent that other texts or utterances deploy words in the same way as a given network, they may be said to resonate with it. To understand how the resonance of one text is operational with another, assume that texts A and B have been represented as CRA networks. The two texts may be of similar nature, or one may be considered a query and the other a text potentially relevant to the query. There are two ways of measuring resonance, one less specific and based on the words common in the two documents, the other more specific and based on word pairs common in the two documents.

Word resonance is calculated directly from the influence scores of the words in the two texts. For example, let the (unique) words (after parsing into phrases) for text A be represented by $\{w_1^A, w_2^A, \ldots w_{N(A)}^A\}$ with corresponding influence scores of $\{I_1^A, I_2^A, \ldots I_{N(A)}^A\}$, where N(A) is the number of (unique) words in text A. Similarly, text B has words $\{w_1^B, w_2^B, \ldots w_{N(B)}^B\}$ with influence scores $\{I_1^B, I_2^B, \ldots I_{N(B)}^B\}$. In general N(A)≠N(B). The indicator function $\alpha^{AB}_{ij}$ is equal to 1 if $w_i^A$ and $w_j^B$ are the same words, and the indicator function is equal to zero if $w_i^A$ and $w_j^B$ are not the same words. Accordingly, the word resonance between texts A and B, $WR_{AB}$, is defined by:

$$WR_{AB} = \sum_{i=1}^{N(A)} \sum_{j=1}^{N(B)} I_i^A \cdot I_j^B \cdot \alpha_{ij}^{AB}$$

The more two texts frequently use the same words in influential positions, the more word resonance they have. The more word resonance they have, the more the communicators used the same words, and the more those words were prominent in structuring the text's coherence. Word resonance is a more general measure of the mutual relevance of two texts, and has applications in the modeling of large corpora.

This measure is unstandardized in the sense that resonance will increase naturally as the two texts become longer in length and contain more common words. There are cases, however, where a standardized measure is more appropriate. For example, in positioning documents relative to one another (as described below), one does not necessarily want to overemphasize differences in document length, number of words, and so on. In these cases the appropriate standardized measure of resonance is given by:

$$WR'_{AB} = WR_{AB} / \sqrt{\sum_{i=1}^{N(A)} (I_i^A)^2 \cdot \sum_{j=1}^{N(B)} (I_j^B)^2}$$

which is structurally equivalent to the manner in which the covariance between two random variables is standardized to a measure of correlation.

Pair resonance is estimated using co-occurring word-pairs, as opposed to co-occurring words. Let the frequency weighted pair influence of words i and j in text T be given by:

$$P_{ij}^T = I_i^T \cdot I_j^T \cdot F_{ij}^T$$

where $I_i^T$ is the influence of $w_i^T$, $I_j^T$ is the influence of $w_j^T$, and $F_{ij}^T$ is the number of times that $w_i^T$ and $w_j^T$ co-occur (their corresponding nodes are connected directly by an edge) in text T. If text T has N (unique) terms, then there will be (N·(N−1)/2) pairs, but many of them will have a value of $F_{ij}^T = 0$ as they will not represent connected terms. Let the indicator function $\beta^{AB}_{ijkl}$ be equal to 1 (a) if the two word sets $(w_i^A, w_j^A)$ and $(w_k^B, w_l^B)$ are equivalent (regardless of the manner in which the set elements are ordered), and (b) $F_{ij}^A$ and $F_{kl}^B$ both are equal to one (the sets represent connected nodes); otherwise the indicator is zero. In other words, the indicator function $\beta^{AB}_{ijkl}$ is 1 when the corresponding pairs of co-occurring words co-occur in both texts. The pair resonance $PR_{AB}$ is defined by:

$$PR_{AB} = \sum_{i=1}^{N(A)-1} \left( \sum_{j=i+1}^{N(A)} \left( \sum_{k=1}^{N(B)-1} \left[ \sum_{l=k+1}^{N(B)} P_{ij}^A \cdot P_{kl}^B \cdot \beta_{ijkl}^{AB} \right] \right) \right)$$

The more pair resonance two texts have, the more their authors assembled words in the same ways, in order to make their communication coherent. Pair resonance is a more sensitive measure of the mutual relevance of two texts than word resonance, because it takes account not only of the words and their position in the network, but how they were assembled in the utterances. Pair resonance has applications in high-accuracy information retrieval tasks.

For the same reasons discussed previously, it may be desirable to form a standardized measure of pair resonance. The standardized measure of pair resonance is as follows:

$$PR'_{AB} = PR_{AB} / \sqrt{\left(\sum_{i=1}^{N(A)-1} \sum_{j=i+1}^{N(A)} (P_{ij}^A)^2\right) \cdot \sqrt{\left(\sum_{k=1}^{N(B)-1} \sum_{l=k+1}^{N(B)} (P_{kl}^B)^2\right)}}$$

Application

The final step in CRA is application, wherein the indexed CRA network, or a set of indexed networks, is used for some analysis task. CRA networks are useful for a wide variety of tasks. One is visualization of the CRA network for text understanding purposes. It is possible to "read" a CRA network and get a good (though necessarily compressed) sense of the content of the original text. In the next section entitled "CRA Applications" we illustrate how that can be done in one application. After that, another application known as spatial modeling of resonance scores is described, which shows how CRA networks can be used to analyze the intellectual organization of a set of scholars. Other applications of CRA networks include, but are not limited to, information retrieval and thematic analysis of collections.

In summary, CRA is a representational technique that describes the extent to which words are prominent in creating a structural pattern of coherence in a text. CRA possesses distinct advantages over other text analysis approaches. First, because CRA networks are independent of text corpora and training sets, they are highly transportable. The influence values for words are calculated only once for a given text, and CRA networks can be computed for single texts, parts of texts, or a sensible aggregation of texts. Second, because it does not depend on training or rules sets, CRA accommodates emergence of new terms or shifts in relationships among existing words and concepts, as should be expected in knowledge development and other forms of innovation. Third, relative to other representational techniques, CRA is structurally sensitive in that it accounts for all likely chains of association between the words that make texts and conversations coherent. This makes the technique more sensitive to complex associations in the text than statistical methods based on word frequency or local co-occurrence. Fourth, CRA is based on a theory of communicative coherence that avoids the imposition of an arbitrary "window" sliding over text to locate word co-occurrence.

CRA APPLICATIONS

Application 1: Analyzing Group Interaction

Figures 2, 3:
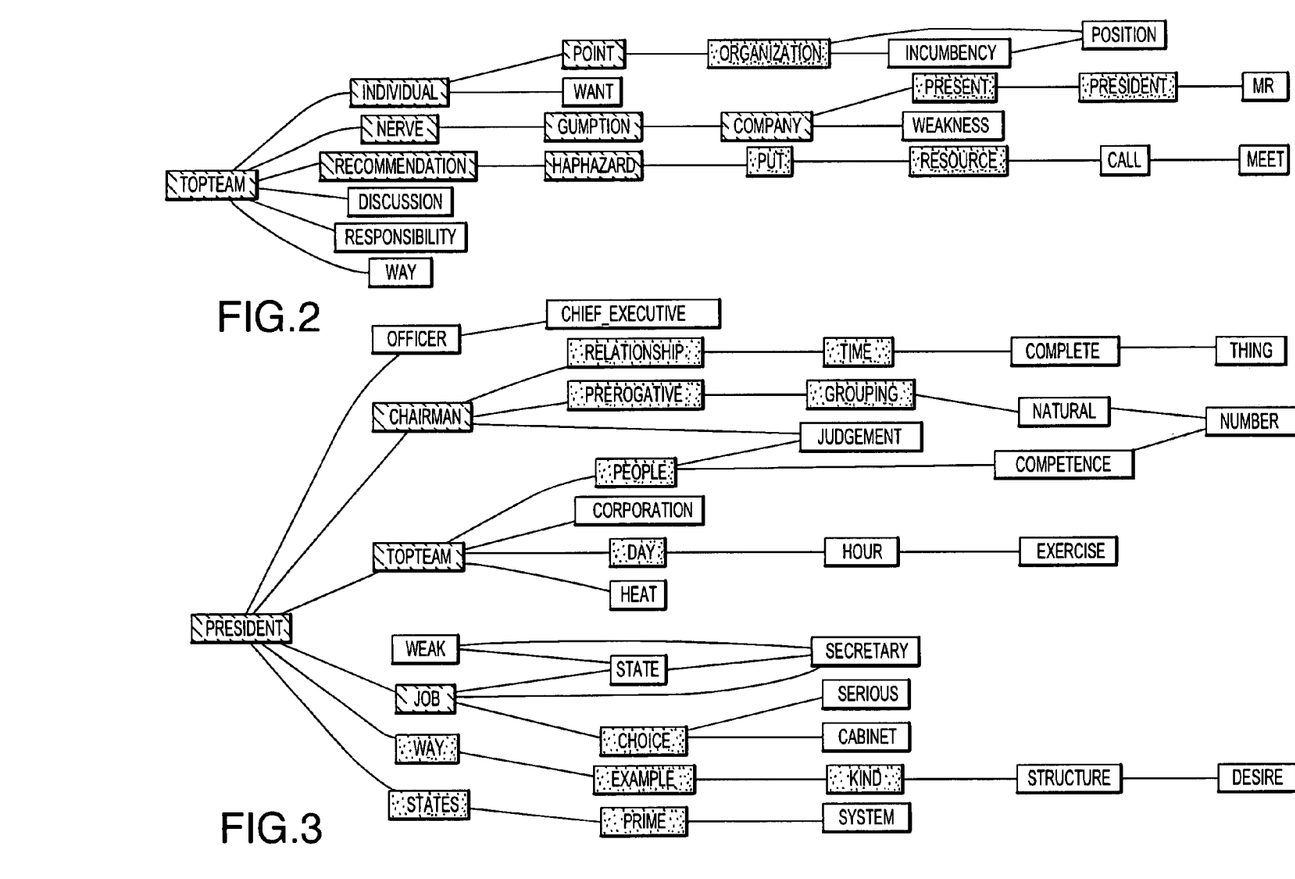
FIG. 2 is a CRA network of those statements in FIG. 1 supporting a need for structural change where highest influence words are in black, next highest influence words are in gray, and next highest influence words are in white with many words lower in influence not shown.
FIG. 3 is a CRA network of those statements in FIG. 1 opposing a need for structural change where highest influence words are in black, next highest influence words are in gray, and next highest influence words are in white with many words lower in influence not shown.
Figure 4:
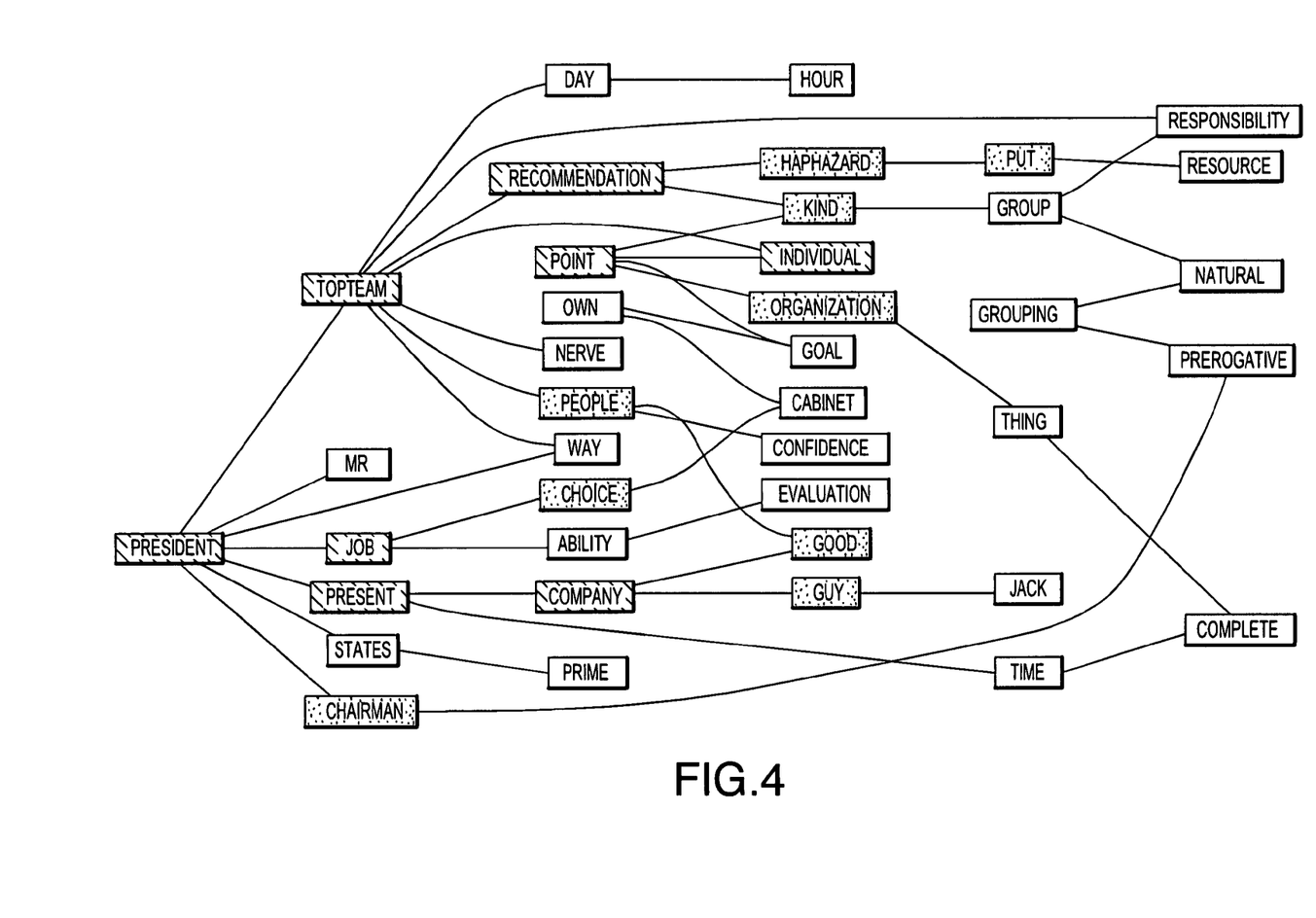
FIG. 4 is a CRA network of the whole relevant section of the transcript including the arguments collected and charted in FIG. 1.

To demonstrate the face validity of CRA network visualizations, an analysis of a transcribed videotape of organizational decision making was conducted. "After Mr. Sam" (Hammond & Pearson, 1974) is a documentary film compiled from a long discussion, at a resort called Palomino, by managers of Steinberg Limited, a Canadian retail chain. The meeting takes place in the early 1970s, just before the founder and CEO, Sam Steinberg, appointed a successor and retired. In an early segment of the discussion, some managers argued that structural changes were needed for the company before Mr. Steinberg's successor was appointed; others argued against such structural changes. In FIG. 1, important statements supporting the need for change (by a group called "The Advocates") and opposing it (by "The Opponents") are cited (in slightly edited form). FIGS. 2 and 3 display the CRA networks of those sets of statements (one for the text in each column). FIG. 4 shows the CRA network derived from the whole relevant section of the transcript (acts 77 through 110, pp. 6–9 of the transcript), including the arguments collected in the samples for the two groups.

The general procedures described above were followed in producing the CRA networks. With CRA, pronoun disambiguation is decided on a case-by-case basis. In this analysis pronoun disambiguation was performed, substituting the word topteam for the pronoun "we," in cases where the speaker clearly was using "we" to refer to the top management committee as an empowered group. The disambiguation was appropriate in this case because the discussion was focused on an issue of whether the topteam group itself, or the new president would make key personnel decisions.

In the Advocates' network shown in FIG. 2, the most influential and most frequently appearing concept is topteam. It is linked to other influential concepts, like individual, nerve, and recommendation, the three next-most influential words. As the graph shows, these words are in turn linked to other influential words including point, gumption, company, and haphazard. A look at FIG. 1 shows why topteam is influential: It is linked to a number of other words in various sentences, and these other words get some of their influence by being linked directly to topteam. The pattern in FIG. 2 clearly represents the focus of the Advocates' arguments that topteam has the duty (established earlier in meetings of this group) to make change recommendations, but is lacking the gumption to do this, and is approaching the task in a haphazard way.

FIG. 3 represents the arguments by the Opponents who do not want to make any definite change recommendation. They emphasize the prerogative of the next president, in concert with future board chairman Sam Steinberg, to decide on changes himself. They believe he needs to have freedom of choice to do so, much as the U.S. President can make Cabinet appointments. Consistent with this position, the influential words in this network include president, chairman, prerogative, and choice. The word topteam is also influential in the Opponents' network, but achieves that influence through its place in arguments that topteam is in danger of usurping presidential choice and should be aware of that danger.

FIG. 4 exhibits a graph based on a larger text sample, about 3 pages of transcript from which the Advocates' and Opponents' arguments were sampled. The network is striking in showing the top words for each group (topteam and president) as central, yet distinct foci of somewhat different, yet connected sub-networks. In the upper portion topteam is the anchor, and is connected with other high influence words individual, recommendation, and people. In the lower portion we find president connected to job, present(—company), chairman, and choice. Interestingly, it is not the case that all words on the bottom were spoken only by opponents and vice versa; for example the chain president—present—company can by found in the Advocates' network in FIG. 1. The word recommendation is rather influential because both groups used it in ways that linked it to various other influential concepts, as they advocated quite different forms of recommendations.

Even though words in the two parts of the network were not exclusively spoken by one side or another, the top and bottom parts of the graph align pretty well with the arguments of the two sides. The advocates sought to link topteam with the responsibility to make a recommendation and not allow some haphazard process to govern changes. The opponents focused on the president's prerogative to choose the people who will do key jobs. Accordingly, that the overall graph conveys the discursive division between the recommendation role of topteam on one hand, and the choice-making job of the president (and the chairman) on the other. This composite example is based on very limited samples of texts. The best use of CRA occurs with much larger bodies of text, in which important concept linkages will be more frequently repeated.

Application 2: Positioning of Authors

Resonance, as described above, is a measure of the mutual relevance of two texts based on their CRA networks. The more they resonate, the more their CRA networks are similar, so computing scores for all pairs of texts in some set yields a similarity matrix. Given a set of objects and similarities between them, a number of useful spatial modeling techniques can be applied to help organize the objects, highlighting important similarities and differences between them. Applying this idea to texts, one can characterize the conceptual structure of the sources from which the texts were drawn. Spatial modeling is a recognized procedure in communication studies for analyzing the relationship between texts.

To illustrate the application of CRA in spatial modeling, its use is described for clustering university faculty in an interdisciplinary research area. While traditionally most academic research occurs within the boundaries of departments, colleges, and disciplines, the majority of "tough problems" that are important today are interdisciplinary. This requires the university and its faculty to be able to identify experts and possible cohorts across departmental and collegiate boundaries, especially as a means of exploiting shifting funding priorities.

Environmental health is an example of such an interdisciplinary area. Its issues require expertise from both the physical and social sciences, and cut across numerous disciplinary boundaries. The Office of the Vice Provost for Research (OVPR) at a large university provided information about some 55 faculty in the university who OVPR believed might have interest and expertise in environmental health. The faculty represented over 15 different departments and were distributed over five different colleges. It was the belief of OVPR that there was little existing interaction between these individuals outside their departments, and that most were probably not aware of each other or their corresponding interests.

OVPR provided a database consisting of personal statements of research interests, grant proposal summaries, and abstracts of published works of the researchers. From this database, article titles, article abstracts, personal statements, and abstracts of funding proposals were used as evidence of each individual's manifest knowledge. In so doing, all works listed on the database were included, regardless of the date of publication or the authorship position of the faculty member. These texts do not exhaust any researcher's knowledge of a content area; however, the combination of these readily available public documents provides a legitimate source to help understand the professional expertise that any individual researcher is likely to claim. In the 55-person database provided by OVPR, there was too little information on seven researchers for their records to be meaningfully analyzed. In some cases, article titles but not abstracts were available; in other cases, there were simply too few entries. Thus, the final set consisted of 48 researchers. Using the technique described above, standardized word resonance scores were computed for each faculty member and scored against all the others.

Figure 5:
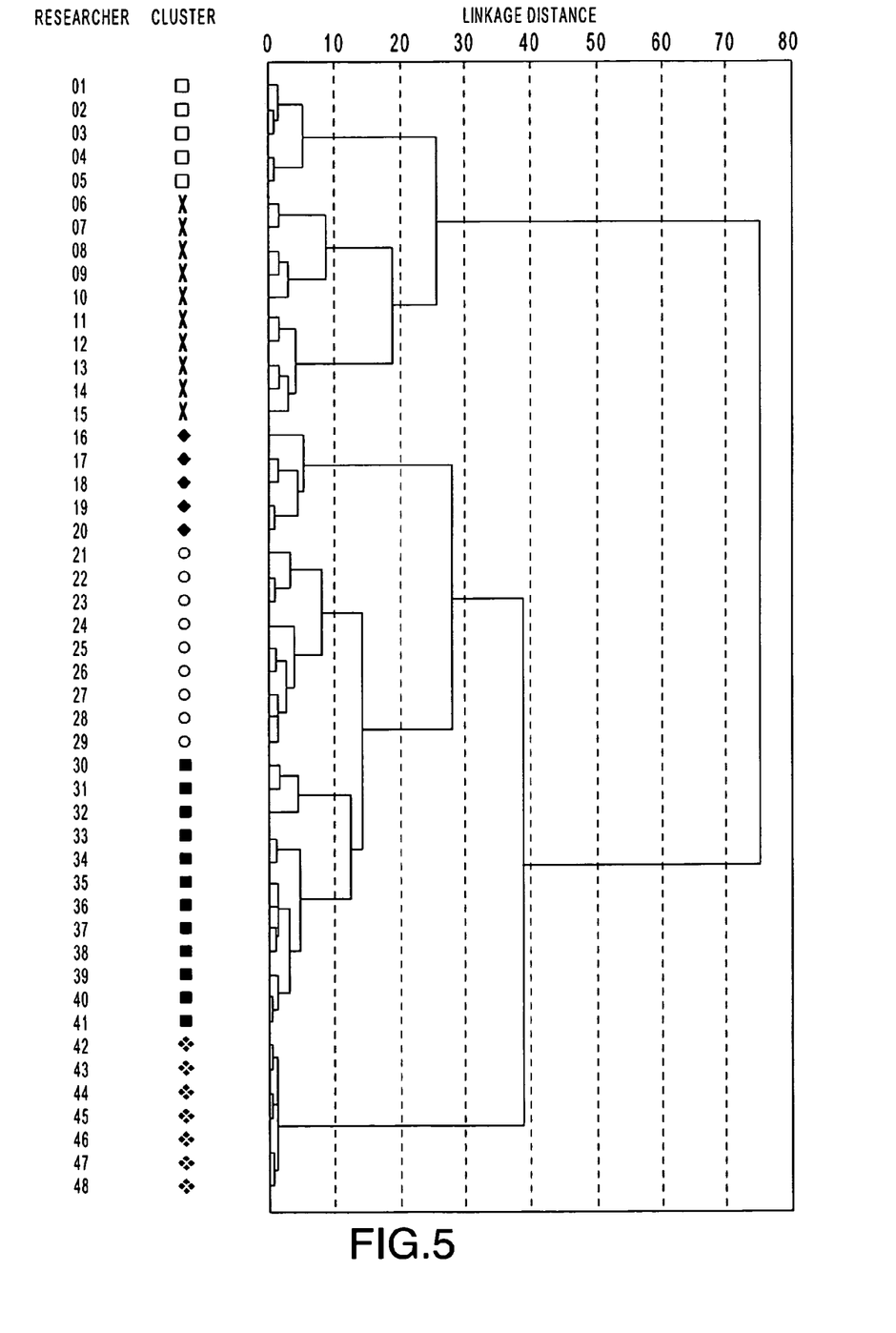
FIG. 5 is a hierarchical cluster analysis using Ward's method for agglomeration of a matrix of similarities between 48 faculty researchers.

A matrix of similarities between the 48 researchers was submitted to hierarchical cluster analysis using Ward's method for agglomeration. Results of this analysis are shown in FIG. 5. The tightest clusters are shown in the shallow brackets toward the left. These are gradually combined into higher-order clusters as the linkage distance (similarity) criterion is relaxed, until that criterion is relaxed so far we are left with one large cluster. In interpreting these plots, one looks for clean breaks that yield a manageable number of distinct clusters. FIG. 5 clearly shows two distinct groups that are not merged until the very end. The top main cluster contains two clear subclusters that remain separate until linkage distance is relaxed to over 20. In the bottom main cluster, four such subclusters are discernable at roughly the same linkage distance.

To aid in visualization of these clusters, multidimensional scaling (MDS) was applied to the similarity data. MDS is a descriptive technique that, like cluster analysis, starts with a set of distances between objects. It uses an iterative procedure to produce a smaller-dimensional space that optimally represents the original distances. In this application, non-metric multidimensional scaling was used because it has a tendency to produce more interpretable spaces. The program KYST2a (Kruskal & Wish, *Multidimensional scaling*, Beverly Hills, Calif.: Sage, 1978) was used to scale the distances. A two dimensional representation produced an adequate fit to the data (stress=0.17).

Figure 6:
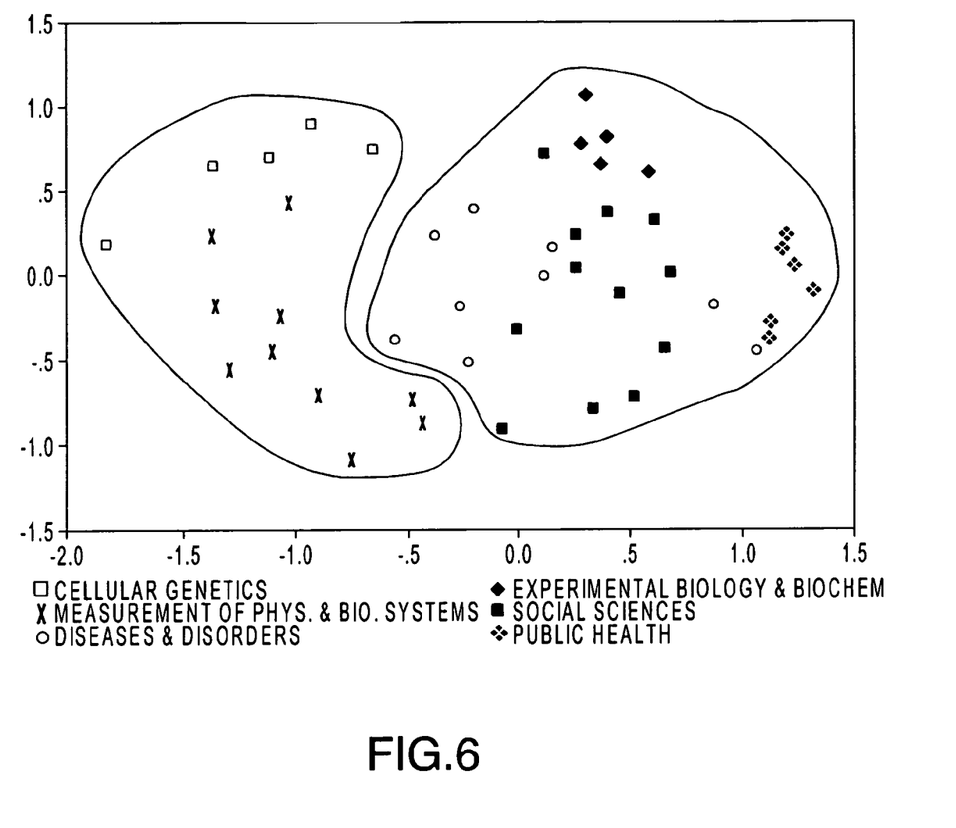
FIG. 6 is a hybrid analysis showing the clusters obtained from the cluster analysis in FIG. 5 superimposed on a scatter plot of multidimensional scaling results of the similarities between the 48 faculty researchers.

MDS produces a set of points in n-dimensional space as its output. The cluster analysis described above reveals groupings of the scaled objects. FIG. 6 represents a hybrid, with the clusters superimposed on a scatter plot of the MDS results. It is apparent from FIG. 6 that the results of the MDS and clustering procedure closely agree. The main clusters are distinct in the space and the subclusters are spatially distinct within these. There is, however, some disagreement between techniques. The right main cluster "bulges" into the left main cluster somewhat along the horizontal axis. Within the right cluster, two members of the subcluster represented by small circles are separated from the bulk of their group. Still, since the overall agreement between the two techniques is good, this is considered to be a "clean" clustering.

To interpret the clusters, the vitas and CRA maps of researchers were viewed for similarities among members of the (sub)clusters. The clearest-cut distinction is between two main clusters, separated on the horizontal axis. This axis is interpreted in hard-soft science-terms: Researchers toward the left, certainly in the left cluster, are physical science oriented, and studying or measuring small-scale chemical and biological processes. Those toward the right are concerned with larger scale phenomena affecting humans and populations of humans.

Within the micro-science cluster on the left, there are two subclusters. Researchers in one group clearly study cell-level processes, especially DNA and genetic processes, and related disorders. This cluster is labeled Cellular Genetics. In the second subcluster, the researchers are concerned with measurement and sensing issues, as applied to physical, biological, and biochemical systems. This cluster is labeled Measurement of Physical and Biological Systems.

Within the cluster on the right, there are four subclusters. In one there are researchers who study basic biological processes. They predominately do experimental studies using humans and animal models. This subcluster is labeled Experimental Biology and Biochemistry. Another group includes researchers interested in diseases, stressors, pathogens, and patterns in such dysfunctions. This cluster is labeled Diseases and Disorders. Next there is a large group that studies psychology, sociology, and communication in individuals, families, and larger social groups. Social Sciences is the label for this subcluster. Finally, there is a group of faculty whose work clearly centers on Public Health.

Maps like these have heuristic value in that they provide a sense of how a group of authors is organized with respect to a common field of knowledge or activity domain. The maps have practical applications as well, and OVPR could use the map in FIG. 6 for practical purposes. What is the best interdisciplinary team to pursue a grant in environmental health? A "breadth" strategy would dictate including members from each cluster, to best tap diverse knowledge resources of the organization. A "depth" strategy might dictate focusing grant-getting efforts in teams from particular clusters. A more general application would be to fill structural holes in the organizational network by ensuring that members of clusters know and have the opportunity to interact with their cluster-mates. Alternatively, cluster maps could be used to identify structural holes that could be filled by hiring employees with the requisite attributes or skills.

There is a steadily increasing volume of rhetoric and mass communication research seeking to analyze large volumes of text, especially on the Internet. Accordingly, quantitative techniques that can be applied by computer will look increasingly attractive. CRA is capable of producing meaningful abstractions of news stories or rhetorical acts, representing their main concepts and interrelationships. These can be compared to one another, and analyzed for change over time. CRA has broad applications in both organizational communication as well as other areas of communication research.

In the foregoing specification, the invention has been described with reference to specific embodiments. However, one of ordinary skill in the art appreciates that various modifications and changes can be made without departing from the scope of the present invention as set forth in the claims below. Accordingly, the specification and the figures showing various applications are to be regarded in an illustrative rather than a restrictive sense, and all such modifications are intended to be included within the scope of the present invention.

The invention claimed is:

1. A method for categorizing text, comprising the steps of:
dividing the text into sentences;
parsing the sentences into one or more noun phrases;
converting the noun phrases into networks of word relationships by linking sequentially occurring noun phrases within each sentence; and
analyzing the networks of word relationships to determine the influence of each word by utilizing betweenness centrality, wherein each centering noun phrase in the networks of word relationships is centrally related with respect to peripheral words to the centering noun phrase while the peripheral words have no relationship between one another so that any association between the peripheral words must pass through the centering noun phrase.

2. The method of claim 1 wherein the step of parsing the sentences into one or more noun phrases comprises the step of substituting disambiguated nouns in place of pronouns which are related to text analysis.

3. The method of claim 1 wherein the step of parsing the sentences into one or more noun phrases further comprises the step of converting plural words to their singular form.

4. The method of claim 1 wherein the step of converting the words into networks of word relationships further comprises the step of linking all possible pairs of words in the noun phrases having three or more words.

5. The method of claim 1 where the step of applying the analyzed network to perform a specific analysis task comprises the step of applying the analyzed network to perform at least one of visualization of the network to understand text, spatial modeling of resonance scores, information retrieval, and thematic analysis of collections.

6. A method for categorizing text comprising the steps of:
dividing the text into sentences;
parsing the sentences into one or more noun phrases;
converting words in the noun phrases into networks of word relationships; and
analyzing the word relationship networks to determine the influence of each word by determining influence by utilizing the following formula:

$$I = \frac{g_{jk}(i)/g_{jk}}{[(N-1)(N-2)/2]}$$

where I is the influence of a word (i) in the text (T) where $g_{jk}$ is the number of shortest paths connecting the $j^{th}$ and $k^{th}$ words, $g_{jk}(i)$ is the number of those paths containing word (i), and N is the number of words in the network.

7. A method for analyzing text comprising the steps of:
dividing the text into sentences;
parsing the sentences into one or more noun phrases;
converting one or more words within each of the noun phrases into networks of relationships between words;
analyzing the networks to determine the influence for each word by utilizing betweenness centrality, wherein each centering noun phrase in the networks of word relationships is centrally related with respect to peripheral words to the centering noun phrase while the peripheral words have no relationship between one another so that any association between the peripheral words must pass through the centering noun phrase; and
applying the analyzed networks to perform a specific analysis task.

8. The method of claim 7 wherein the step of parsing the sentences into one or more noun phrases further comprises the step of substituting disambiguated nouns in place of pronouns which are relevant to text analysis.

9. The method of claim 7 wherein the step of parsing the sentences into one or more noun phrases further comprises the step of converting plural words to their singular form.

10. The method of claim 7 wherein the step of converting the word or words into networks of relationships comprises the step of linking all sequentially occurring noun phrases within a sentence.

11. The method of claim 10 wherein the step of converting the words into networks of relationships between words further comprises the step of linking all possible pairs of words in the noun phrases having three or more words.

12. The method of claim 7 wherein the step of analyzing the networks to determine the influence of each word comprises the step of determining influence by utilizing the following formula:

$$I = \frac{g_{jk}(i)/g_{jk}}{[(N-1)(N-2)/2]}$$

where I is the influence of a word (i) in the text (T) where $g_{jk}$ is the number of shortest paths connecting the $j^{th}$ and $k^{th}$ words, $g_{jk}(i)$ is the number of those paths containing word (i), and N is the number of words in the network.

13. The method of claim 7 where the step of applying the analyzed network to perform a specific analysis task comprises the step of applying the analyzed network to perform at least one of visualization of the network to understand text, spatial modeling of resonance scores, information retrieval, and thematic analysis of collections.

14. A method for determining resonance based on common words in two sets of text comprising the step of utilizing the following formula:

$$WR_{AB} = \sum_{i=1}^{N(A)} \sum_{j=1}^{N(B)} I_i^A \cdot I_j^B \cdot \alpha_{ij}^{AB}$$

where $WR_{AB}$ is the word resonance between texts A and B, $\{w_1^A, w_2^A, \ldots w_{N(A)}^A\}$ are unique words for text A after parsing into phrases where N(A) is the number of unique words in text A, $\{I_1^A, I_2^A, \ldots I_{N(A)}^A\}$ are influence scores calculated for the unique words in text A, $\{w_1^B, w_2^B, \ldots w_{N(B)}^B\}$ are unique words for text B after parsing into phrases where N(B) is the number of unique words in text B, $\{I_1^B, I_2^B, \ldots I_{N(B)}^B\}$ are influence scores calculated for the unique words in text B, and indicator function $\alpha_{ij}^{AB}$ is equal to 1 if $w_i^A$ and $w_j^B$ are the same words, and the indicator function is equal to zero if $w_i^A$ and $w_i^B$ are not the same words.

15. The method of claim 14 further comprising the step of determining standardized resonance based on common words in texts A and B comprising the step of utilizing the following formula:

$$WR'_{AB} = WR_{AB} \bigg/ \sqrt{\sum_{i=1}^{N(A)} (I_i^A)^2 \cdot \sum_{j=1}^{N(B)} (I_j^B)^2}$$

where $WR_{AB}'$ is the standardized word resonance between texts A and B, $WR_{AB}$ is the actual word resonance between texts A and B, $$\sum_{i=1}^{N(A)} (I_i^A)^2$$

is the sum of all influence scores for the unique words in text A squared, and $$\sum_{j=1}^{N(B)} (I_j^B)^2$$

is the sum of all influence scores for the unique words in text B squared.

16. A method for searching two or more texts utilizing resonance scores obtained in accordance with claim 14.

17. A method for searching two or more texts utilizing resonance scores obtained in accordance with claim 15.

18. A method for modeling two or more texts utilizing resonance scores obtained in accordance with claim 14.

19. A method for modeling two or more texts utilizing resonance scores obtained in accordance with claim 15.

20. A method for determining pair resonance based on common word pairs in two sets of text comprising the step of utilizing the following formula:

$$PR_{AB} = \sum_{i=1}^{N(A)-1} \left[ \sum_{j=i+1}^{N(A)} \left( \sum_{k=1}^{N(B)-1} \left[ \sum_{l=k+1}^{N(B)} P_{ij}^A \cdot P_{kl}^B \cdot \beta_{ijkl}^{AB} \right] \right) \right]$$

where $PR_{AB}$ is the word pair resonance between texts A and B, $P_{ij}^A$ is the frequency weighted pair influence of words i and j in text A and is equal to $I_i^A \cdot I_j^A \cdot F_{ij}^A$ where $F_{ij}^A$ is the number of times that $w_i^A$ and $w_j^A$ co-occur in text A, $P_{ij}^B$ is the frequency weighted pair influence of words k and l in text B and is equal to $I_k^B \cdot I_l^B \cdot F_{kl}^B$ where $F_{kl}^B$ is the number of times that $w_k^B$ and $w_l^B$ co-occur in text B, and indicator function $\beta_{ijkl}^{AB}$ is equal to 1 if the two word sets $(w_i^A, w_j^A)$ and $(w_k^B, w_l^B)$ are equivalent and if $F_{ij}^A$ and $F_{kl}^B$ both are equal to one, otherwise the indicator is zero.

21. The method of claim 20 further comprising the step of determining standardized resonance based on common word pairs in texts A and B comprising the step of utilizing the following formula:

$$PR_{AB}' = PR_{AB} \Big/ \sqrt{\left( \sum_{i=1}^{N(A)-1} \sum_{j=i+1}^{N(A)} (P_{ij}^A)^2 \right)} \cdot \sqrt{\left( \sum_{k=1}^{N(B)-1} \sum_{l=k+1}^{N(B)} (P_{kl}^B)^2 \right)}$$

where $PR'_{AB}$ is the standardized word pair resonance between texts A and B and $PR_{AB}$ is the actual word pair resonance between texts A and B.

22. A method for searching two or more texts utilizing resonance scores obtained in accordance with claim 20.

23. A method for searching two or more texts utilizing resonance scores obtained in accordance with claim 21.

24. A method for modeling two or more texts utilizing resonance scores obtained in accordance with claim 20.

25. A method for modeling two or more texts utilizing resonance scores obtained in accordance with claim 21.

26. A method for analyzing text comprising the steps of:
a) compartmentalizing the text into defined units;
b) categorizing the defined units by:
  parsing the units into one or more noun phrases each comprising one or more words,
  converting the word or words into networks of relationships between words by linking sequentially occurring noun phrases within a defined unit, and
  analyzing the networks of word associations to determine the structural influence of each word by utilizing betweenness centrality, wherein each centering noun phrase in the networks of word relationships is centrally related with respect to peripheral words to the centering noun phrase while the peripheral words have no relationship between one another so that any association between the peripheral words must pass through the centering noun phrase; and
c) applying the analyzed network to perform a specific analysis task.

27. The method of claim 26 wherein the step of compartmentalizing the text into defined units comprises the step of breaking down the text into sentences.

28. The method of claim 26 wherein the step of parsing the units into one or more noun phrases further comprises the step of substituting disambiguated nouns in place of pronouns which are relevant to text analysis.

29. The method of claim 26 wherein the step of parsing the units into one or more noun phrases further comprises the step of converting plural words to their singular form.

30. The method of claim 26 wherein the step of converting the word or words into networks of relationships further comprises the step of linking all possible pairs of words in those noun phrases having three or more words.

31. The method of claim 26 wherein the step of analyzing the network to determine the structural influence of each word comprises the step of determining structural influence by utilizing the following formula:

$$I = \frac{g_{jk}(i)/g_{jk}}{[(N-1)(N-2)/2]}$$

where I is the influence of a word (i) in the text (T) where $g_{jk}$ is the number of shortest paths connecting the $j^{th}$ and $k^{th}$ words, $g_{jk}(i)$ is the number of those paths containing word (i), and N is the number of words in the network.

* * * * *